(12) United States Patent
Dawson et al.

(10) Patent No.: US 10,079,371 B2
(45) Date of Patent: Sep. 18, 2018

(54) ELECTROCHEMICAL MULTI-CELL AND METHOD THEREFOR

(71) Applicant: A123 Systems, LLC, Waltham, MA (US)

(72) Inventors: James E. Dawson, Macomb, MI (US); Mujeeb Ijaz, West Bloomfield, MI (US)

(73) Assignee: A123 Systems, LLC, Waltham, MA (US)

( * ) Notice: Subject to any disclaimer, the term of this patent is extended or adjusted under 35 U.S.C. 154(b) by 72 days.

(21) Appl. No.: 15/110,729

(22) PCT Filed: Jan. 9, 2015

(86) PCT No.: PCT/US2015/010914
§ 371 (c)(1),
(2) Date: Jul. 8, 2016

(87) PCT Pub. No.: WO2015/106168
PCT Pub. Date: Jul. 16, 2015

(65) Prior Publication Data
US 2016/0336547 A1   Nov. 17, 2016

Related U.S. Application Data

(60) Provisional application No. 61/925,534, filed on Jan. 9, 2014.

(51) Int. Cl.
| | |
|---|---|
| *H01M 2/02* | (2006.01) |
| *H01M 10/0587* | (2010.01) |
| *H01M 2/30* | (2006.01) |
| *H01M 10/04* | (2006.01) |
| *H01M 2/04* | (2006.01) |

(Continued)

(52) U.S. Cl.
CPC ......... *H01M 2/0242* (2013.01); *H01M 2/046* (2013.01); *H01M 2/24* (2013.01); *H01M 2/30* (2013.01); *H01M 10/0422* (2013.01); *H01M 10/0525* (2013.01); *H01M 10/0587* (2013.01)

(58) Field of Classification Search
None
See application file for complete search history.

(56) References Cited

U.S. PATENT DOCUMENTS

| | | |
|---|---|---|
| 4,385,101 A | 5/1983 | Catanzarite |
| 5,279,908 A | 1/1994 | Bones et al. |
| 6,399,232 B1 | 6/2002 | Eshraghi |

(Continued)

FOREIGN PATENT DOCUMENTS

KR   1020040104657 A   12/2004

OTHER PUBLICATIONS

ISA Korean Intellectual Property Office, International Search Report Issued in Application No. PCT/US2015/010914, dated Apr. 23, 2015, WIPO, 4 pages.

*Primary Examiner* — Wojciech Haske
(74) *Attorney, Agent, or Firm* — McCoy Russell LLP

(57) ABSTRACT

An electrochemical storage multi-cell may comprise: a housing, including a plurality of concentric annular cell chambers; a plurality of electrochemical storage cells, wherein each of the plurality of annular cells are positioned in one of the plurality of annular cell chambers, and the plurality of annular cells are electrically connected in series; and conductive electrolyte filling each of the annular cell chambers.

12 Claims, 15 Drawing Sheets

(51) Int. Cl.
*H01M 2/24* (2006.01)
*H01M 10/0525* (2010.01)

(56) References Cited

U.S. PATENT DOCUMENTS

| | | | |
|---|---|---|---|
| 8,309,259 B2 | 11/2012 | Friesen et al. | |
| 2003/0232248 A1* | 12/2003 | Iwamoto | H01M 4/66 429/233 |
| 2007/0224494 A1* | 9/2007 | Kim | H01M 10/0431 429/142 |
| 2009/0130553 A1* | 5/2009 | Nakamura | H01M 2/0413 429/178 |

* cited by examiner

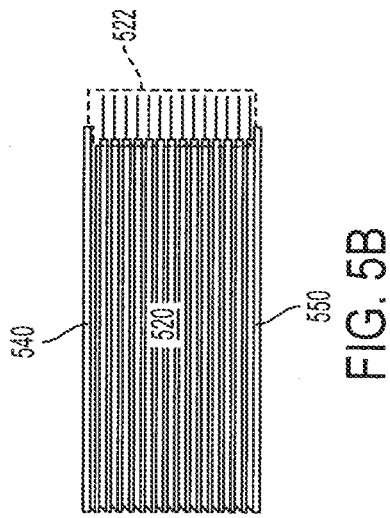
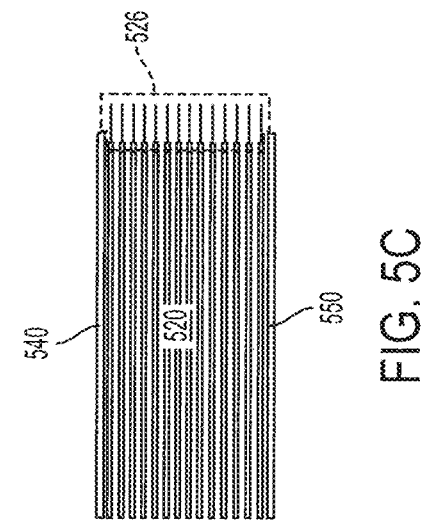
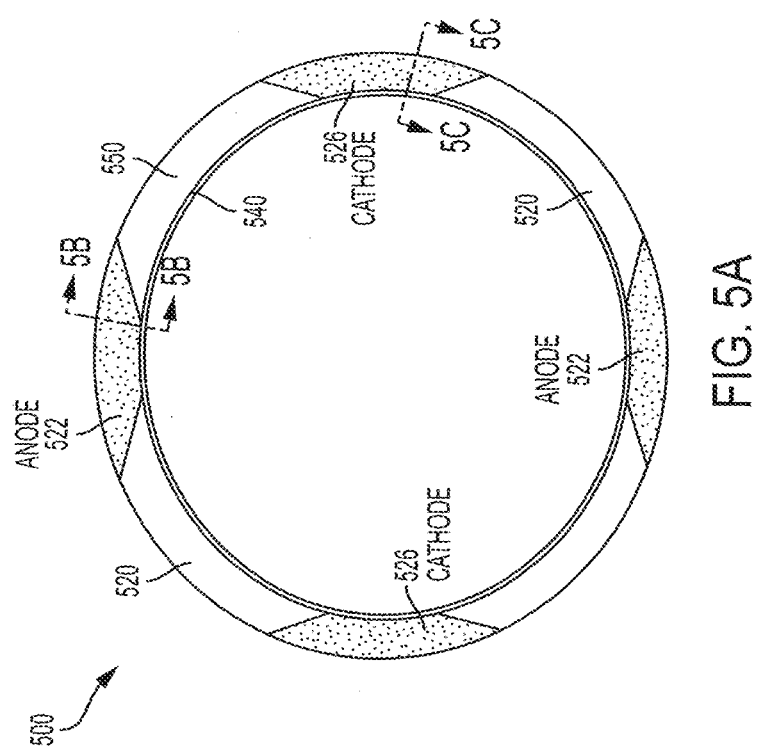

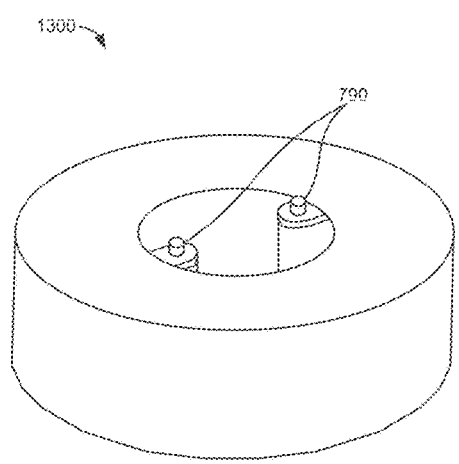 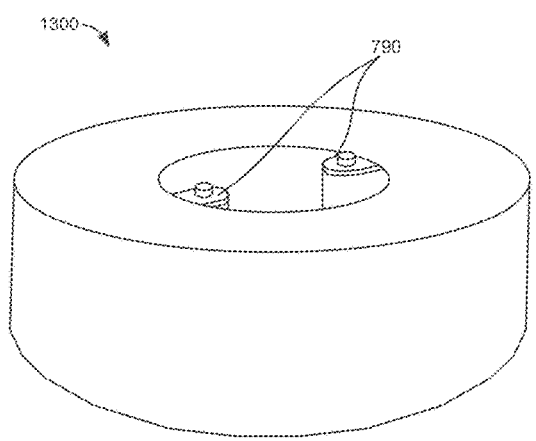
FIG. 13A
FIG. 13B

ELECTROCHEMICAL MULTI-CELL AND METHOD THEREFOR

CROSS REFERENCE TO RELATED APPLICATIONS

This application is the U.S. National Phase of International Patent Application Serial No. PCT/US2015/010914, entitled "Electrochemical Multi-Cell And Method Therefor", filed Jan. 9, 2015, which claims priority to U.S. Provisional Patent Application No. 61/925,534, entitled "Electrochemical Multi-Cell and Method Therefor", filed Jan. 9, 2014, the entire contents of each of which are hereby incorporated by reference in their entirety for all purposes.

TECHNICAL FIELD

This disclosure relates to an electrochemical multi-cell, and method therefor, providing equivalent or increased electrical and thermal performance and reduced manufacturing cost relative to conventional devices.

BACKGROUND AND SUMMARY

In order to produce a high power cylindrical electrochemical cell with low electrical impedance, current production techniques comprise multiple electrically conducting tabs to be attached, normally by welding, to the electrode substrate foil at several points along the electrode length. In order to decrease the cell impedance, the number of tabs are increased accordingly.

Several conventional methods of discrete tab attachment are currently employed in the manufacture of electrochemical storage cells, electrochemical capacitors, electrolytic capacitors, dry film capacitors and similar electrical devices. Conventional methods for discrete tab attachment include removing a coating in regions on both sides of a coated electrode and welding tabs to the exposed uncoated regions, and subsequently applying an insulating cover layer over the welded tab and the exposed foil on the opposite side of the electrode from the tab. In other conventional methods, the coating removal step may be avoided by partially coating the electrode surfaces, leaving uncoated coating-free electrode edge foils. Furthermore, tabs may be adhered to or alternately, cut out and formed from uncoated electrode regions. Insulating tape may then be applied to cover the tabs in order to prevent electrical shorting at the tab edges. Conventional methods for providing electrical connection of the electrodes to the wound electrode assembly without discrete tabs include blind through welding of coating-free edge foils to a plate. Electrical connection may also be provided by holding a plate in mechanical compression against the uncoated electrode foil edges.

The inventors herein have recognized potential issues with the above approaches. Namely, with the use of discrete tabs, electrical current may be channeled to a small area of the tabs at discrete points along the electrode, creating areas that may operate at significantly higher temperature than the remainder of the electrode due to high localized ohmic heating. Furthermore, cell Amp-hour (Ah) capacity is reduced overall due to the uncoated regions for tab attachment, localized differences in the anode to cathode capacity ratio in the uncoated regions may cause localized lithium plating in the case of the Li-ion battery cell chemistry. Further still, cell manufacturing complexity is increased and manufacturing speed is decreased, requiring additional functions to accomplish the coating removal, tab welding and taping operations, and demands a greater financial investment to start up production. Further still, cell manufacturing process speed may be reduced to perform coating removal, tab welding and tab taping, thereby increasing cell manufacturing cost.

One approach that at least partially addresses the above issues includes an electrochemical storage multi-cell, comprising: a housing, including a plurality of concentric annular cell chambers; a plurality of electrochemical storage cells, wherein
each of the plurality of annular cells are positioned in one of the plurality of annular cell chambers, and the plurality of annular cells are electrically connected in series; and conductive electrolyte filling each of the annular cell chambers.

In another embodiment, a method for an electrochemical storage multi-cell, comprises positioning each of a plurality of electrochemical storage cells in concentric annular chambers of a housing, the number of the concentric annular chambers corresponding to the plurality of electrochemical storage cells; electrically connecting each of the plurality of electrochemical storage cells in series; and filling each of the annular cell chambers with conductive electrolyte.

In this way, an electrochemical storage multi-cell having a very large format and providing equivalent or improved electrical and thermal performance and reduced manufacturing costs relative to conventional electrochemical storage multi-cells is provided. Furthermore, the electrochemical storage multi-cell may be produced without welding tabs to individual electrodes, thereby reducing manufacturing time and cost. Further still, cylindrical electrochemical storage multi-cells may be produced with low impedance electrical connections between electrode foils and housing terminals, thereby allowing high power operation while reducing manufacturing cost. Further still, cylindrical electrochemical storage multi-cells with low thermal resistance in relation to one another and increased component sharing may be provided, thereby reducing the number of components and the manufacturing complexity of the electrochemical storage multi-cells, reducing the size of the electrochemical storage multi-cells per unit power, and reducing manufacturing cost (resulting from reduced number of components and handling thereof, and reduced manufacturing complexity).

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A schematically shows an end view of a cylindrical winding core with wound electrode sheets.

FIG. 5B schematically shows a cross-sectional view of the cylindrical winding core with wound electrode sheets of FIG. 5A taken at section B-B.

FIG. 5C schematically shows a cross-sectional view of the cylindrical winding core with wound electrode sheets of FIG. 5A taken at section C-C.

FIGS. 13A and 13B schematically show perspective top and bottom views of an electrochemical storage multi-cell.

DETAILED DESCRIPTION

Figure 1:
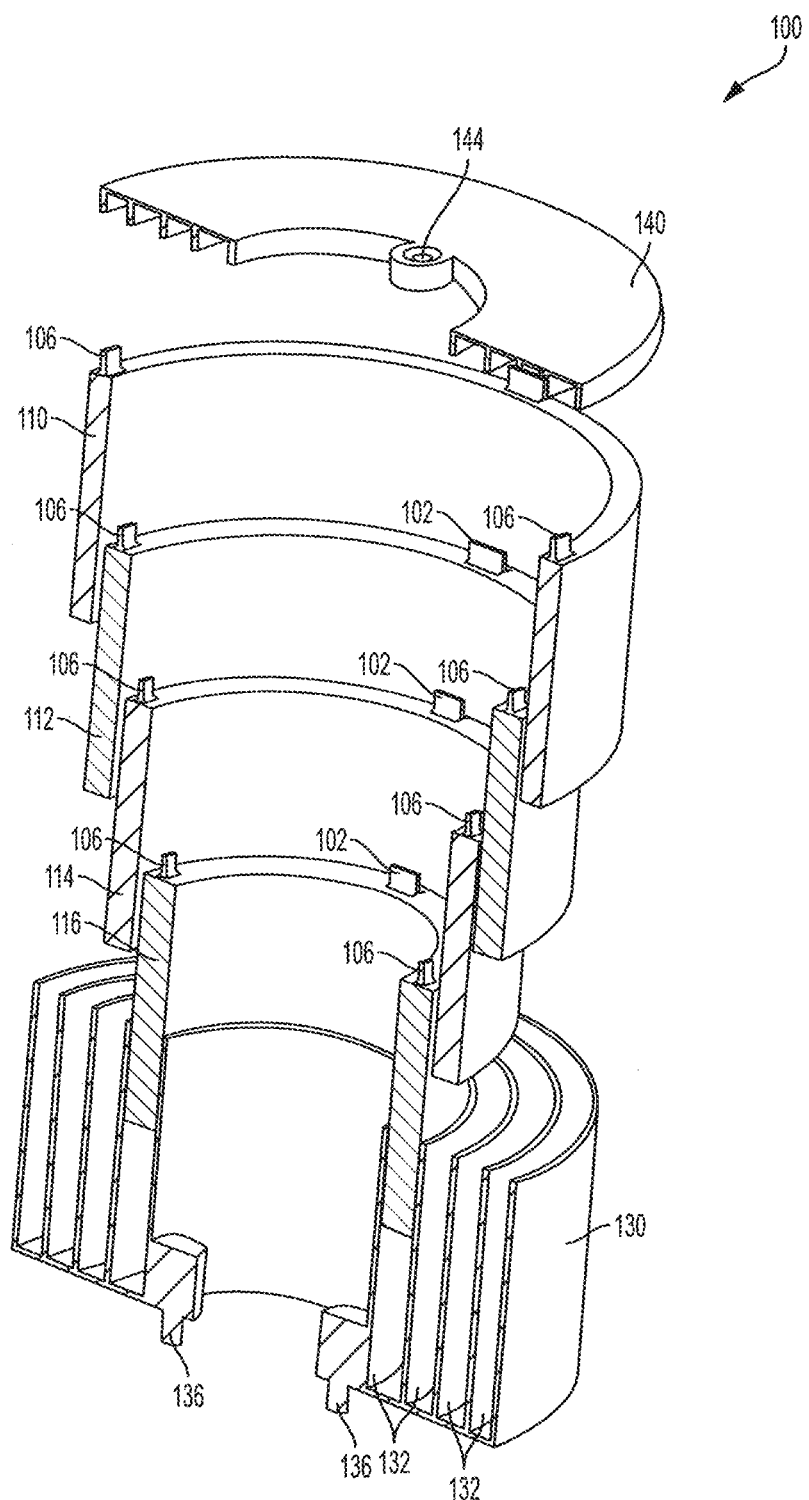
FIG. 1 schematically shows an exploded perspective view of a cross section of an electrochemical multi-cell.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that unless otherwise noted the drawing figures included in this disclosure are schematic and generally not drawn to scale. Rather, the various drawing scales, aspect ratios, and numbers of components shown in the figures may be purposely distorted to make certain features or relationships easier to see. However, FIGS. 1, 5A-5C, 6-11, 12A, 12B, 13A, and 13B are drawn to scale, although other relative dimensions may be used.

The present description relates to a cylindrical electrochemical storage multi-cell and a fabrication method thereof providing equivalent or improved electrical and thermal performance and reduced manufacturing costs as compared with conventional cylindrical electrochemical storage multi-cells and conventional fabrication methods thereof.

Figure 6:
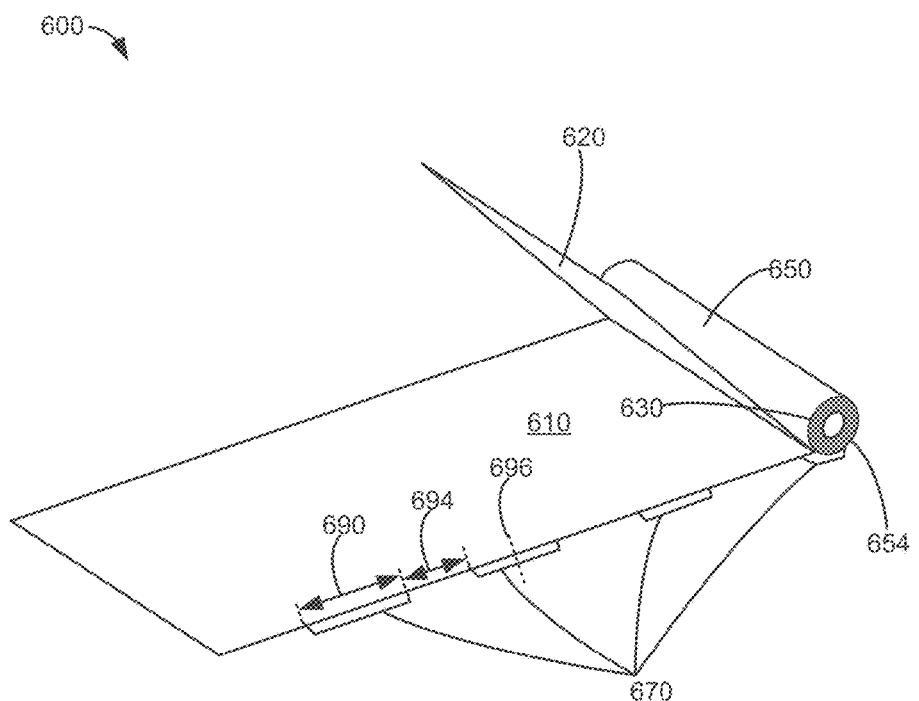
FIG. 6 schematically shows a perspective view of a partially formed electrochemical storage cell during a winding process.
Figure 7:
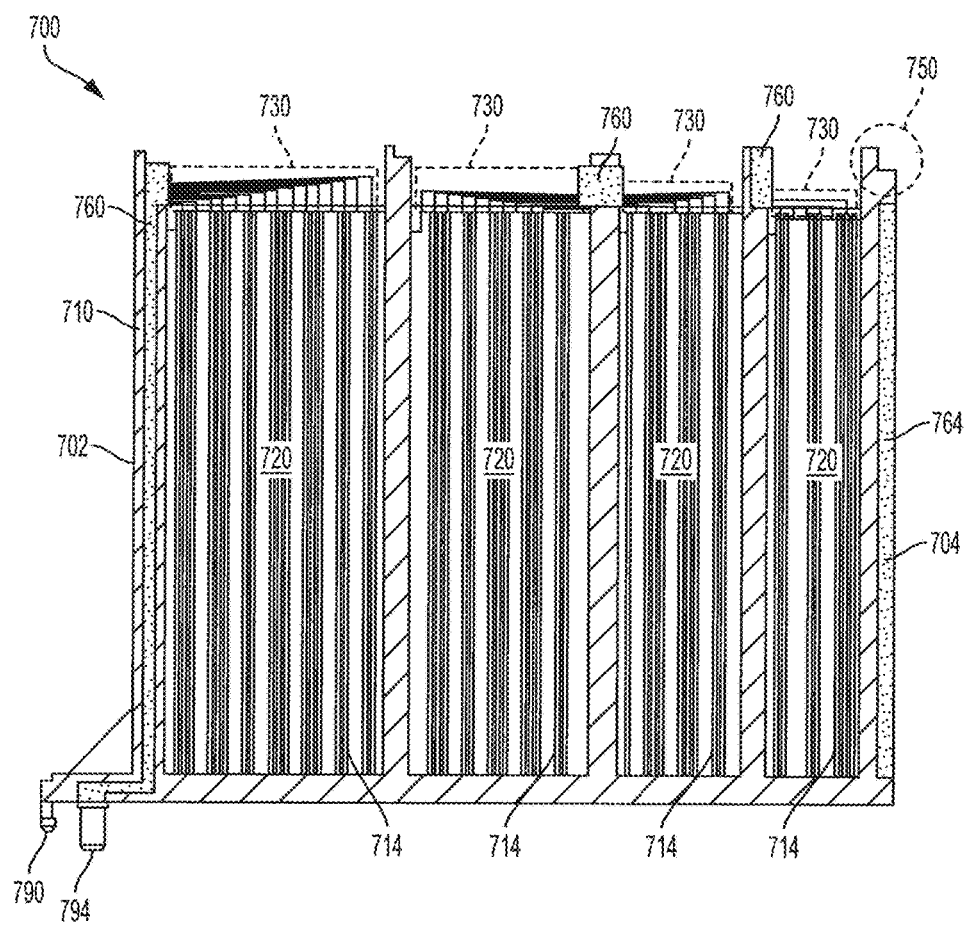
FIG. 7 schematically shows a cross-sectional view of an electrochemical storage multi-cell.
Figure 8:
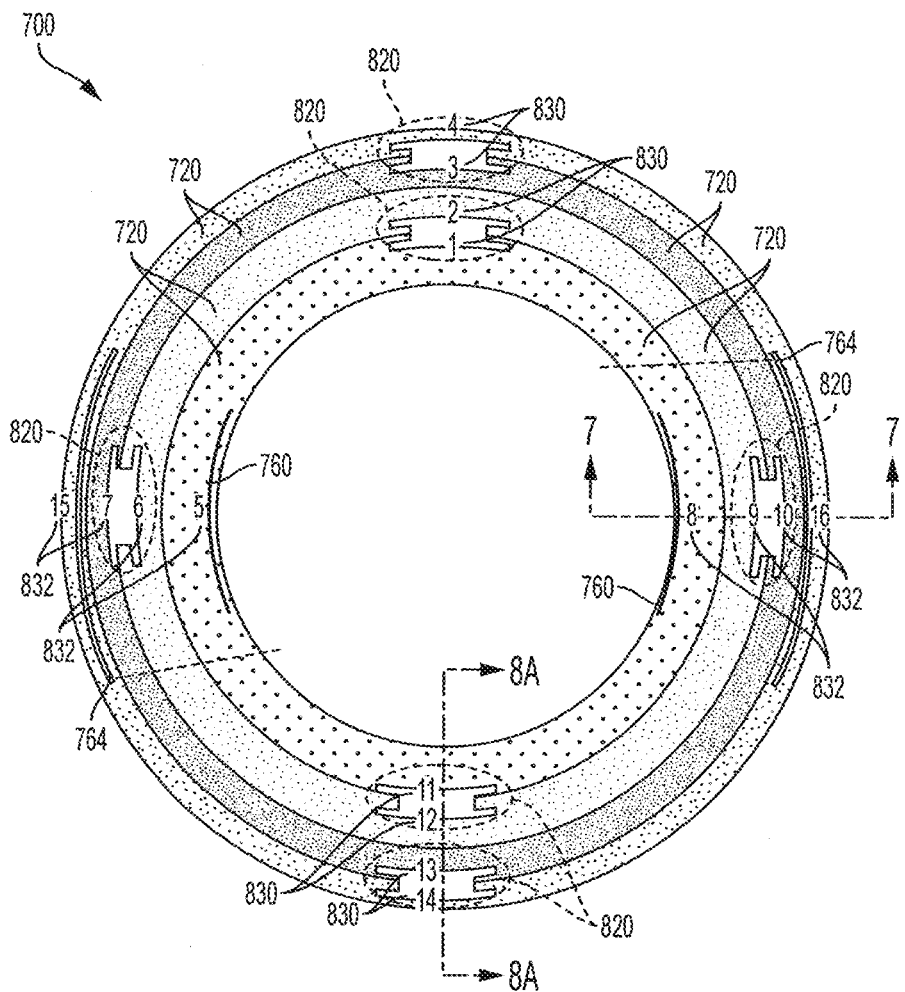
FIG. 8 schematically shows a plan view of an electrochemical storage multi-cell.
Figure 9:
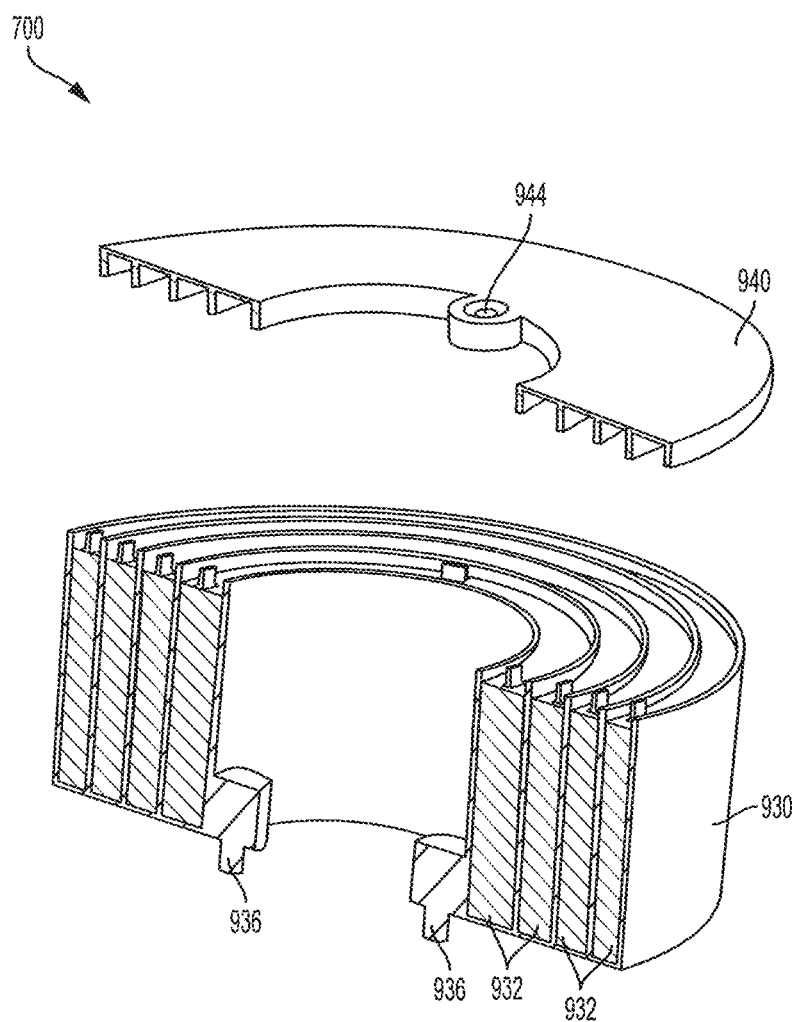
FIG. 9 schematically shows an exploded cross-sectional perspective view of an electrochemical storage multi-cell.
Figure 10:
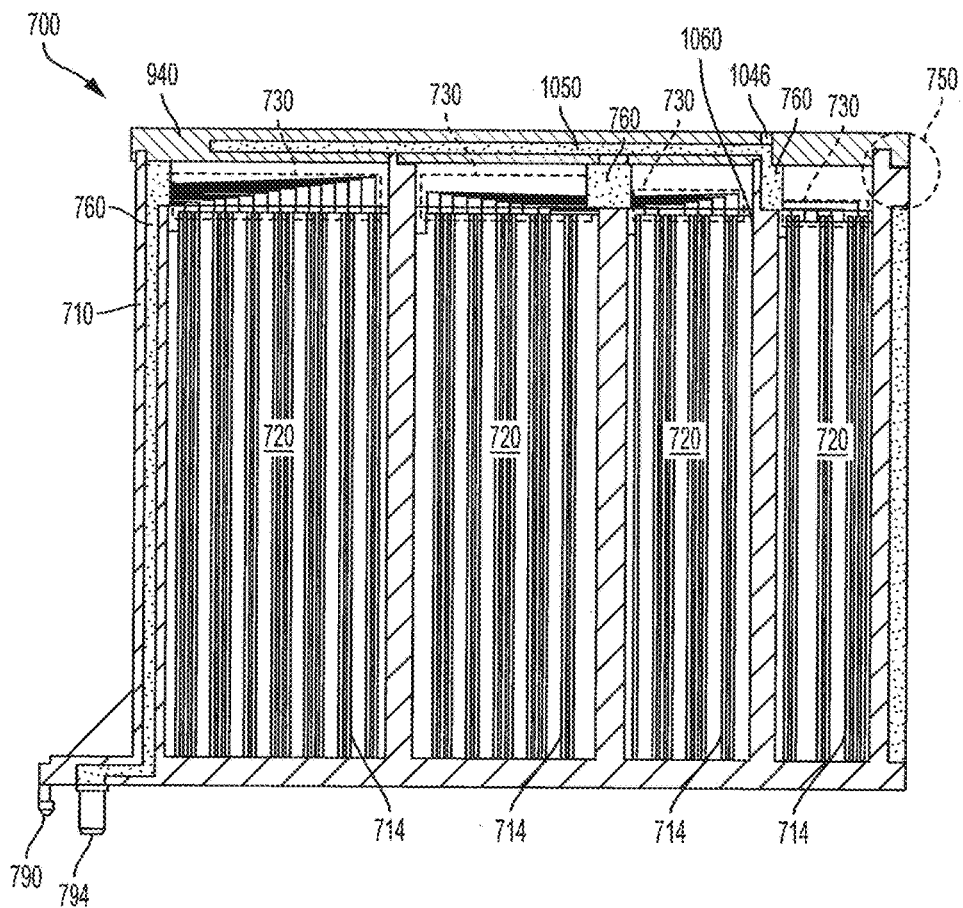
FIG. 10 schematically shows a cross-sectional view of an electrochemical storage multi-cell.
Figure 11:
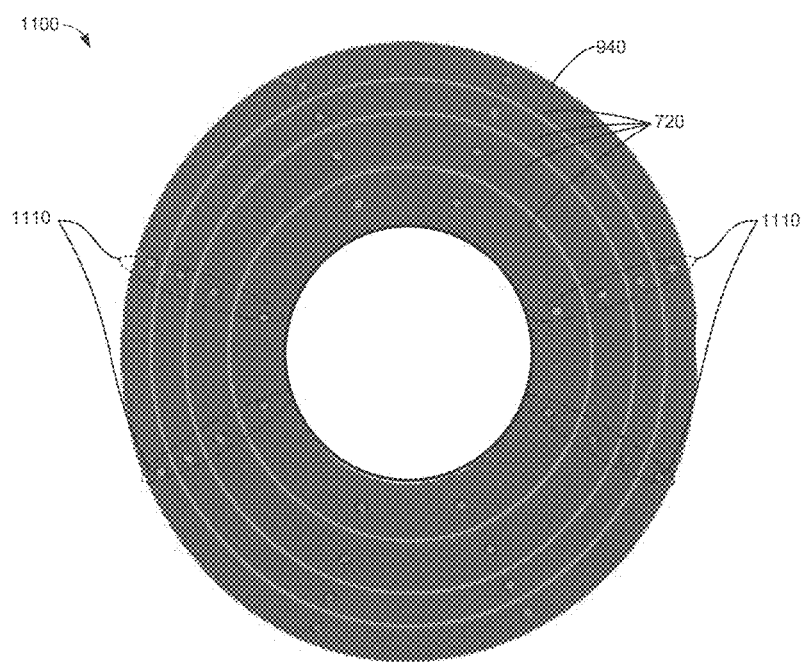
FIG. 11 schematically shows a top view of an electrochemical storage multi-cell.
Figure 12A:
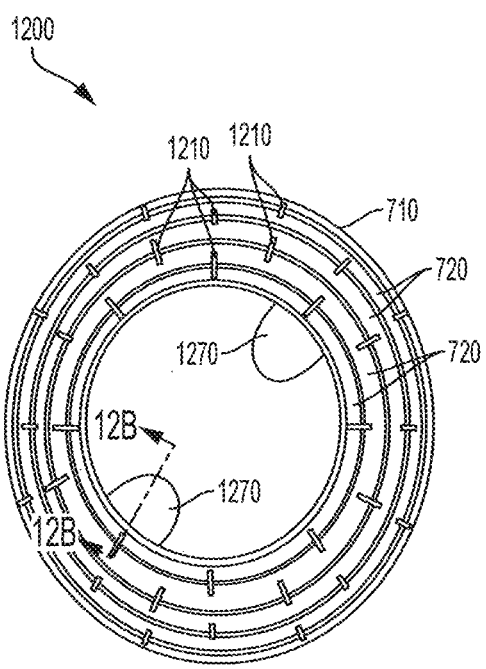
FIG. 12A schematically shows a plan view of an electrochemical storage multi-cell.
Figure 12B:
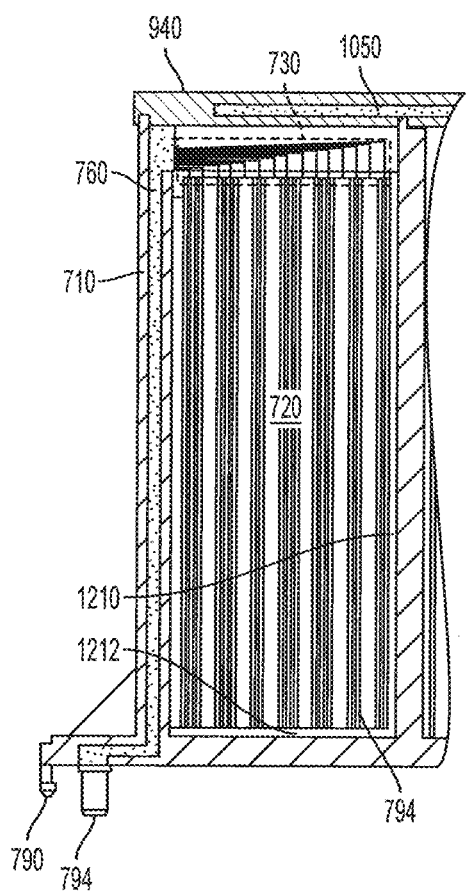
FIG. 12B schematically shows a cross-sectional view of the electrochemical storage multi-cell of FIG. 12A taken at section 12B-12B.
Figure 14:
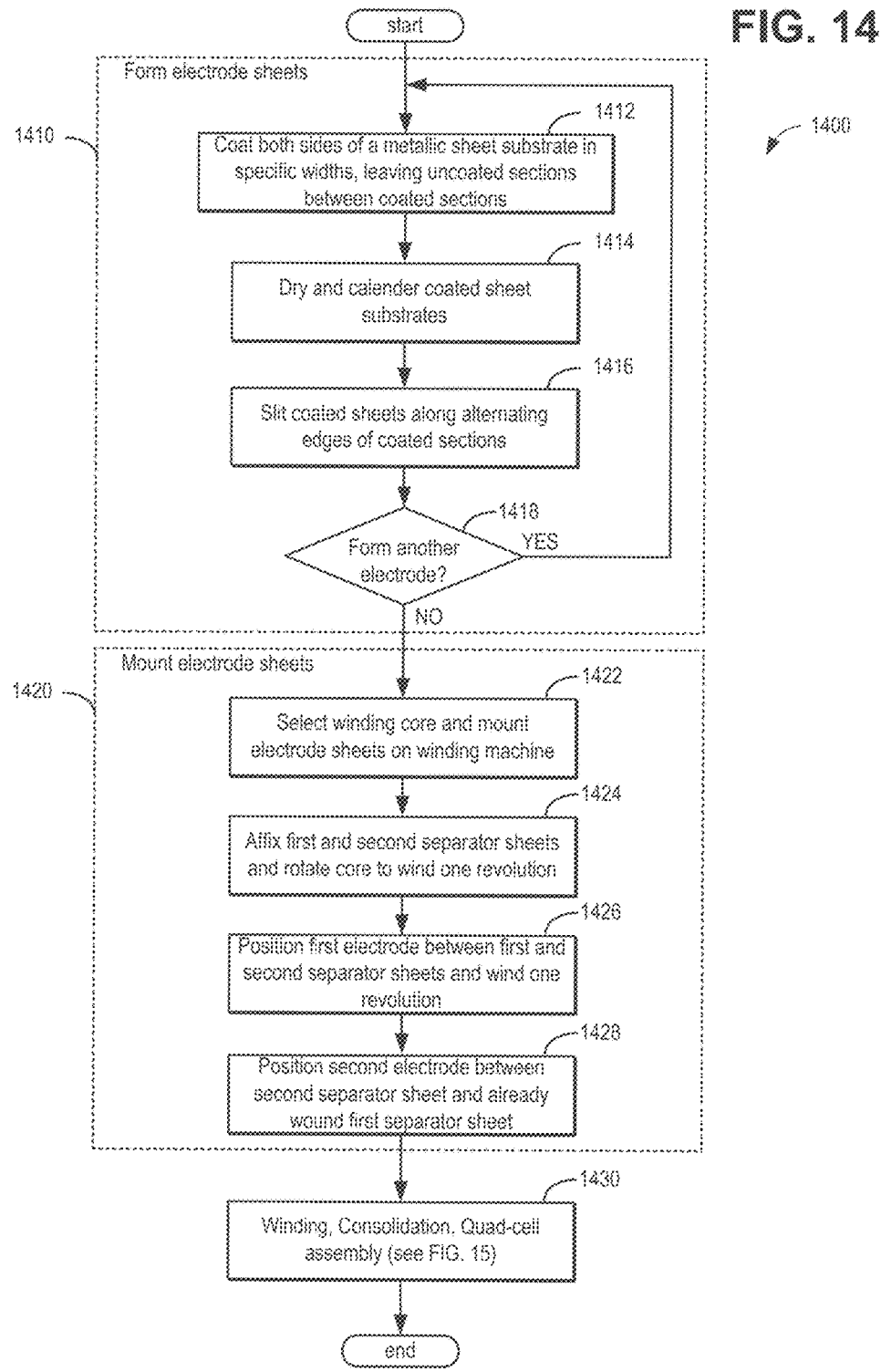
FIGS. 14-15 illustrate flow charts for an example method for an electrochemical storage multi-cell.
Figure 15:
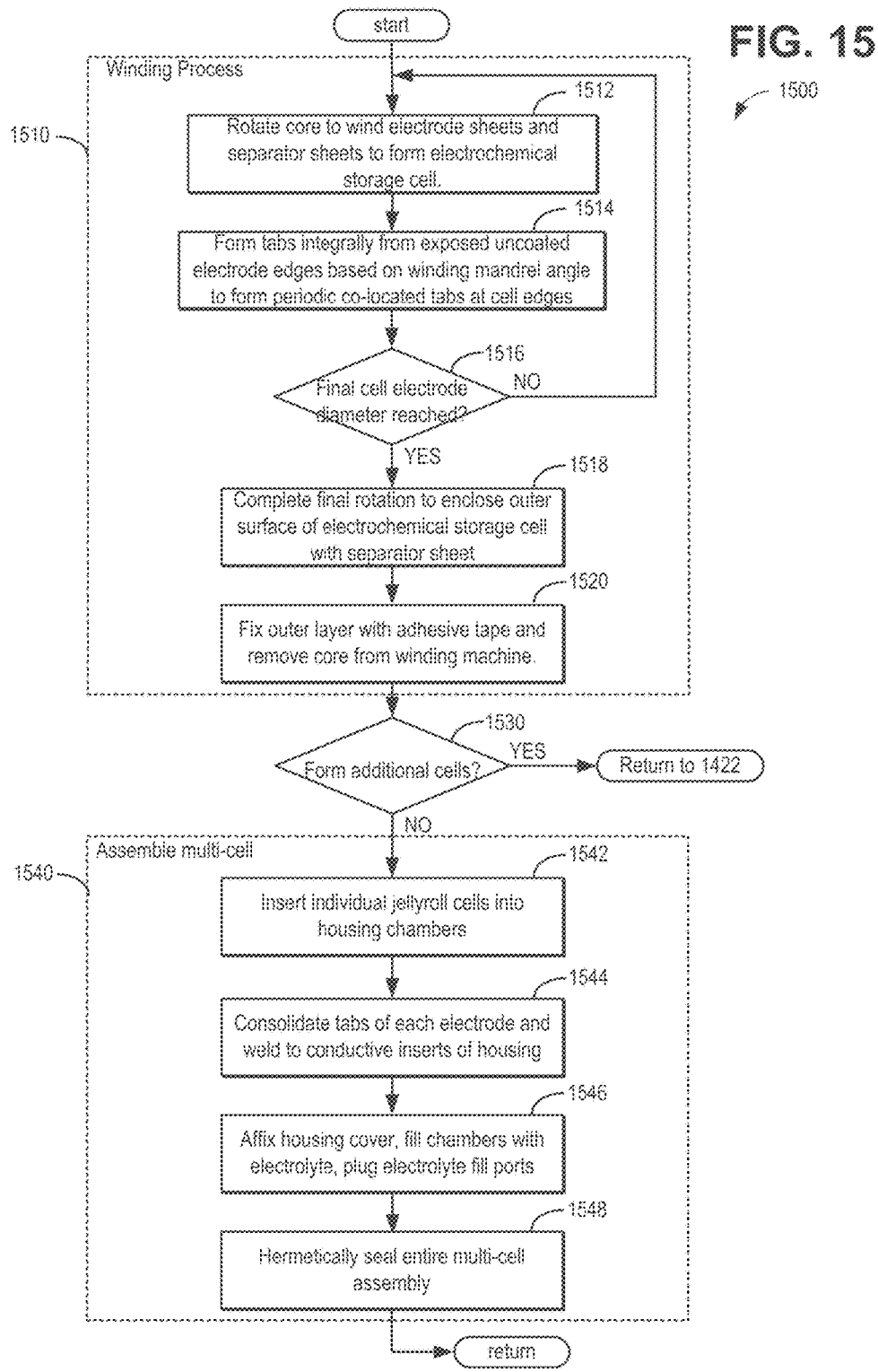

An exploded cross-sectional perspective view of an example embodiment of an electrochemical storage multi-cell is illustrated in FIG. 1. FIGS. 2A, 2B, 3A, and 3B illustrate plan and perspective views, respectively, of a coated electrode for an electrochemical storage cell. An example cylindrical winding core of an electrochemical storage cell is depicted in FIGS. 4A, 4B, 4C, and 4D, and an end side view of an example cylindrical winding core with partially wound first and second separator sheets and partially wound first and second electrodes of an electrochemical storage cell is shown in FIG. 4E. FIG. 5A schematically shows an end view of an electrochemical storage cell, and FIGS. 5B and 5C schematically cross-sections of the electrochemical storage cell of FIG. 5A taken at sections 5B-5B and 5C-5C, respectively. FIG. 6 shows a perspective view of a partially formed electrochemical storage cell during a winding process. FIG. 8 is a plan view of an electrochemical storage multi-cell, and FIG. 7 is a cross-sectional view of the electrochemical multi-cell of FIG. 8 taken at section 7-7. FIG. 9 shows a perspective of an exploded cross-sectional view of an electrochemical storage multi-cell. FIG. 10 schematically shows a cross-sectional view of an electrochemical multi-cell, including a cover fixed to the housing. FIG. 11 schematically shows a plan view of a cover of an electrochemical storage multi-cell. FIG. 12A schematically shows a plan view of an electrochemical storage multi-cell housing 1200, and FIG. 12B schematically shows a cross-section of the housing of FIG. 12A taken at section 12B-12B. FIGS. 13A and 13B illustrate top and bottom perspective views of an electrochemical storage multi-cell. FIGS. 14-15 illustrate flow charts for an example method for an electrochemical storage multi-cell.

Methods for producing electrochemical storage multi-cells with low electrical impedance conventionally include attaching multiple electrically conducting tabs to electrode substrates (foil) of each individual electrochemical storage cell at several points along the length of the electrodes. Furthermore, the number of tabs attached to the electrode is increased in order to correspondingly decrease the impedance of the electrochemical storage cell. Several conventional methods of discrete tab attachment are currently employed in the manufacture of electrochemical storage cells, electrochemical capacitors, electrolytic capacitors, dry film capacitors and similar electrical devices. In one example conventional method, an electrode coating is interrupted or removed across the width of the electrode on both sides, exposing the underlying metallic substrate foil. A tab is then welded to this area of exposed foil. An insulating cover layer, such as adhesive tape is then applied over the welded tab area and the exposed foil on the opposite side of the electrode. In another example conventional method, an electrode coating is removed on both sides from a small rectangular area near the edge of the electrode, exposing the underlying foil on both sides. A tab is welded to the exposed foil in the previously cleared rectangular area. Insulating tape or similar is applied to both sides of the tab welding area. In another example conventional method, electrodes are coated with a coating free edge zone area of exposed foil which is free of coating on both sides. Tabs are welded to this exposed foil area and may be insulated with tape to prevent electrical shorting at the tab sharp edges.

Use of discrete tabs attached to the electrode substrate may be disadvantageous in that electrical current is channeled to a small area of the tabs at discrete points along the electrode, creating areas that may operate at significantly higher temperature than the remainder of the electrode due to high localized ohmic heating, especially when the cell is under heavy electrical load. Furthermore, cell Ah capacity is reduced overall due to areas of coating removal required to attach tabs. Localized differences in the electrode (e.g., anode to cathode) capacity ratio in the exposed areas may cause areas of lithium plating in the case of the Li-ion battery cell chemistry. Further still, cell manufacturing equipment is more complex, requiring additional functions to accomplish the coating removal, tab welding and taping operations, and demands a greater financial investment to start up production. Further still, the cell manufacturing process speed is reduced in order to accomplish the coating removal, tab welding and tab taping operations, thus increasing the cell manufactured cost.

Turning now to FIG. 1, it illustrates an exploded cross-sectional view of an example of an electrochemical storage multi-cell (multi-cell) 100. Multi-cell 100 includes a housing 130 with multiple discrete cell chambers 132, and a cover 140. Housing 130 may be cylindrical in shape, wherein the multiple cell chambers 132 each comprise annular cylindrical chambers concentrically formed therein. The housing 130 may also house a plurality of individual electrochemical storage cells, each of the plurality of individual electrochemical storage cells housed in and corresponding in size to one of the concentric cell chambers 132. Accordingly, the electrochemical storage cells may be cylindrically shaped to correspond to the dimensions of the annular cylindrical cell chambers 132 concentrically formed in the housing 130. FIG. 1 illustrates an example of an electrochemical storage quad-cell, the electrochemical storage quad-cell being an electrochemical storage multi-cell comprising four individual electrochemical storage cells 110, 112, 114, and 116 housed in four concentric cell chambers 132 of the housing 130. As an example, the electrochemical storage quad-cell may be a large format 12V electrochemical storage quad-cell, wherein each individual electrochemical storage cell comprises a 3V electrochemical storage cell.

Housing 130 may comprise a plastic housing or other nonconductive housing material. A plastic housing may be advantageous for reducing a mass of the multi-cell, reducing a cost of the multi-cell, and for facilitating fabrication of the multi-cell features via molding, extrusion, and the like. The housing 130 may be designed to include interconnecting bus bars insert molded into the housing to properly position the bus bars in the housing 130. Furthermore, each of the discrete cell chambers 132 may contain only one electrochemical storage cell stack (jellyroll structure). Accordingly, the housing chambers 132 may mechanically, electrochemically, and environmentally isolate each electrochemical storage cell from electrochemical storage cells in adjacent chambers.

As further described below, each individual electrochemical storage cell may comprise a electrode sheets and separator sheets supported and wound around a cylindrical winding core, the wound electrode sheets and separator sheets forming a jellyroll structure. The electrode sheets may comprise a partially coated electrically conductive substrate (foil), including a coated central portion between uncoated conductive edges. The uncoated conductive edges may be formed as externally protruding tabs in an axial direction relative to the cylindrical winding core. Furthermore, the tabs may be positioned along the foil to be angularly co-located relative to the central axis of the cylindrical winding core upon winding of the electrode sheets and separator sheets upon the cylindrical winding core. Multiple groups of angularly co-located tabs may be formed by spacing the tabs along a length the electrode sheets prior to winding the electrode sheets on the cylindrical winding core. In the example electrochemical storage multi-cell 100, tabs 106 comprise two diametrically opposed groups of angularly co-located tabs, and tabs 102 comprise two diametrically opposed groups (only one group is shown in FIG. 1) of angularly co-located tabs offset 90° from tabs 106. An offset of 90° may aid manufacturing efficiency by increasing the manufacturing repeatability and accuracy of the tab positioning on the electrode sheets. For example, offsetting angularly co-located groups of tabs other than at 90° may increase manufacturing complexity, and/or increase the number of manufacturing defects. Furthermore, offsetting angularly co-located groups of tabs other than at 90° may increase a spacing between adjacent and opposing co-located groups of tabs, which may increase heat generation and which may reduce a risk of arcing or shorting between co-located groups of tabs of a first electrode sheet and a second electrode sheet.

The groups of co-located tabs may be corresponding groups in that each tab in each group may comprise a tab of the same angular arc length along each wound electrode layer in the jellyroll structure. Furthermore, the pairs of groups of the angularly co-located tabs may be formed approximately diametrically opposite, for example within a few degrees of being exactly diametrically opposite, or exactly diametrically opposite to one another about the cylindrical winding core. Furthermore, the groups of tabs at either axial end of the electrochemical storage cell 100 may be angularly aligned. Note that the tab shape may be rounded, cornered, square, rectangular, triangular, toothed, or other such shape, and is not necessarily limited to features that are formed by physically cutting out material.

Electrochemical storage multi-cell 100 may further comprise cover 140, which fluidly isolates each of the chambers 132, when affixed to housing 130. Cover 140 may comprise a high current female interconnect terminal 144, and electrochemical storage multi-cell 100 may further comprise high current male interconnect terminals 136.

The jellyroll structure of electrochemical cells may comprise coated first and second electrode sheets and first and second separator sheets (generally depicted as 520 in FIG. 5) wound around a cylindrical core 540 to form a low electrical impedance electrochemical storage cells without welded discrete tabs to the individual electrodes. As shown in the example of FIG. 4B, a cylindrical core 400 of an electrochemical storage cell may have a keyed center, such as a hexagonal center which may help to facilitate mounting and dismounting the cylindrical core to a winding mandrel and may help in rotating the core during winding, as will be described further below.

Figure 2A:
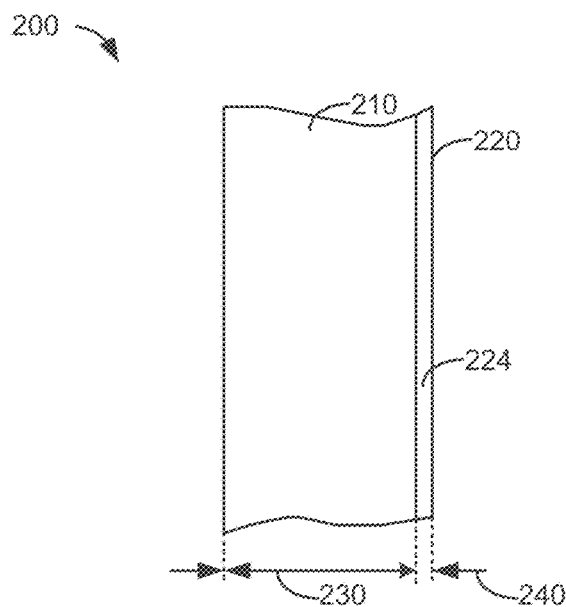
FIGS. 2A, 2B schematically show a plan view and a perspective view of a coated electrode for an electrochemical storage cell, respectively.
Figure 2B:
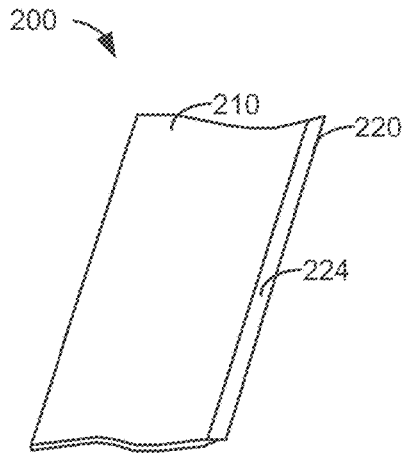

Turning now to FIGS. 2A and 2B, they illustrate a step in a method for forming a first electrode sheet 200. In one example, the first electrode may comprise an anode. However, the first electrode may instead comprise a cathode, a positive electrode, or a negative electrode. In the case of an anode for a lithium-ion electrochemical storage cell, the first electrode may comprise an electro-active lithium intercalation material or metallic lithium coating that is coated onto both sides of a metallic foil substrate in a continuous coating process. The coating may be applied in specific widths 230, leaving uncoated edge sections 224 of foil between the coated sections. After application of the coating, the electrode with coated surfaces may be dried and calendered. The coated sheet material may then be slit along alternating edges 220 of the coated sections, resulting in a continuous electrode material with exposed uncoated edge sections 224 of foil extending a specific width 230 from the coated area 210 on one edge of the electrode sheet 200. First electrode sheet 200 also includes a width 240 of the uncoated edge sections 224 of foil.

Figure 3A:
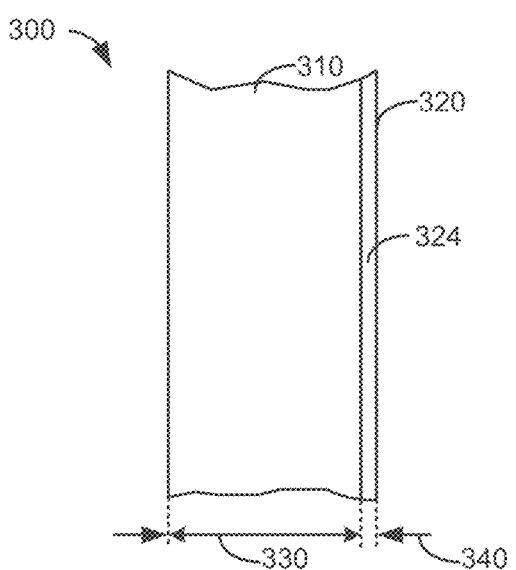
FIGS. 3A, 3B schematically show a plan view and a perspective view of a coated electrode for an electrochemical storage cell, respectively.
Figure 3B:
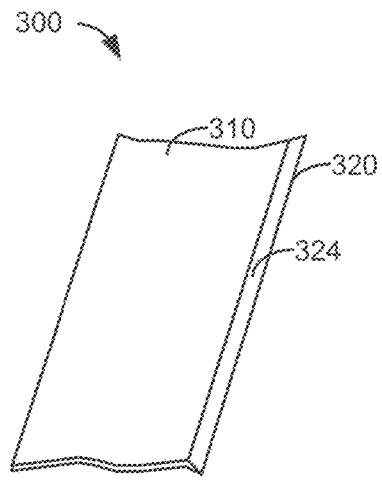

Turning now to FIGS. 3A and 3B, they illustrate a step in a method for forming a second electrode sheet 300. In one example, the second electrode may comprise a cathode. However, the second electrode may instead comprise an anode, a positive electrode, or a negative electrode. In the case of a cathode for a lithium-ion electrochemical storage cell, the second electrode may comprise a mixture of a specially prepared lithiated iron-phosphate powder, a conductive carbon, and polymeric binder. The mixture may be coated onto both sides of a metallic foil substrate in a continuous coating process to form the second electrode 300. The coating may be applied in specific widths 330, leaving uncoated edge sections 324 of foil between the coated sections. After application of the coating, the electrode with coated surfaces may be dried and calendered. The coated sheet material may then be slit along alternating edges 320 of the coated sections, resulting in a continuous electrode material with exposed uncoated edge sections 324 of foil extending a specific width 330 from the coated area 310 on one edge of the electrode 300. First electrode sheet 300 also includes a width 340 of the uncoated edge sections 324 of foil.

Figure 4A:
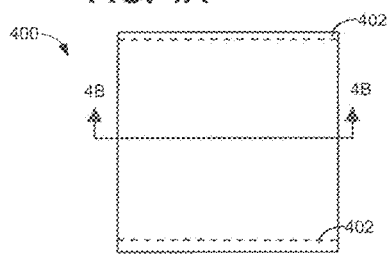
FIGS. 4A, 4B, 4C, and 4D schematically show side, cross-sectional, end, and perspective views of a winding core of an electrochemical storage cell.
Figure 4B:
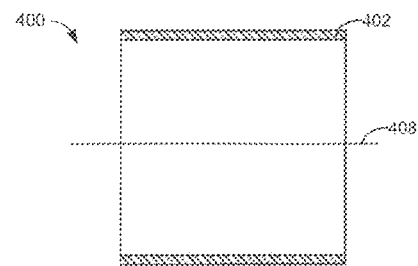
Figure 4C:
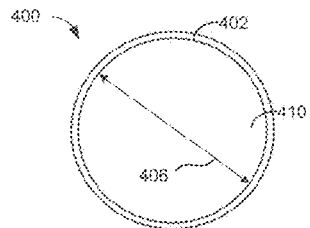
Figure 4D:
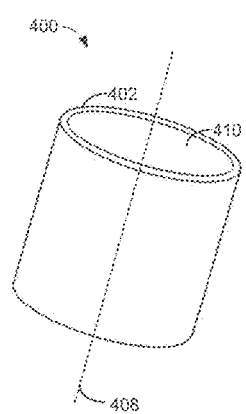
Figure 4E:
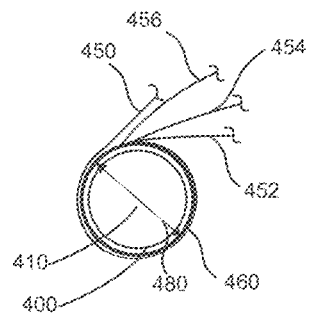
FIG. 4E schematically shows an end view of a cylindrical winding core with partially wound electrode sheets.

Turning now to FIGS. 4A-4D, they illustrate an example of a cylindrical winding core 400 for an electrochemical storage cell. Cylindrical winding core 400 may comprise a hollow central core 410. A length of the cylindrical winding core may be less than a width of the first and second electrode sheets so that the edges of the electrode sheets protrude in an axial direction beyond the ends of the cylindrical winding core 400. The cylindrical winding core 400 may comprise a metal core or a plastic core, and walls 402. Walls 402 may be thick enough for providing structural support to the jellyroll structure and the winding thereof, while being thin enough so that the electrochemical storage cell may be inserted into one of the cell chambers 132. Accordingly, the inner diameter 406 of the cylindrical winding core 400 may be large enough to insert the electrochemical storage cell into one of the cell chambers 132. FIG. 4A illustrates a side view of 4B illustrates a side view of the cylindrical winding core 400, and FIG. 4B illustrates a cross-sectional view of the cylindrical winding core 400 taken at section 4B-4B through central axis 408 of the cylindrical winding core 400.

Turning now to FIG. 4E, it illustrates an end view of a cylindrical winding core 400 with partially wound electrode sheets and separator sheets. As described above, the cylindrical winding core 400 may comprise a hollow central core 410. As illustrated in FIG. 4E, a first separator sheet 450, a first electrode sheet 452, a second separator sheet 454, and a second electrode sheet 456 may be wound, in that order, around the cylindrical winding core 400. Partially wound layers 460 of the electrode sheet and separator sheets form a wound external diameter 480 of the electrochemical storage cell. First and second separator sheets 450, 454 may comprise non-conductive materials. For example, the first and second separator sheets 450, 454 may comprise a polymer material.

To assemble the electrochemical storage cell jellyroll structure, a hollow plastic or metallic cylindrical winding core 400 may be placed or mounted on the shaft of a winding machine. Widthwise edges of first and second separator sheets 450 and 454 may be centered along an axial length of the core, and fixed to the core using adhesive tape. The cylindrical winding core 400 may then be rotated at least one revolution. The first electrode widthwise edge may be positioned parallel to the cylindrical winding core axis 470 between the first and second separator sheets. The winding core may then be rotated one revolution, thereby trapping and fixing the first electrode sheet 452 between the first and second separator sheets 450, 454. Next, the second electrode sheet 456 may be positioned parallel to the cylindrical winding core axis 470 between the second separator sheet 454 and the already wound on the core, first separator sheet 450. The cylindrical winding core may then be rotated continuously until the desired lengths of the first and second electrode sheets has be wound into the jellyroll configuration, and/or the final overall wound diameter 480 is achieved. FIG. 4E further illustrates the first and second separator sheets, 450 and 454 respectively, and the first and second electrode sheets, 452 and 456 respectively, wound in layers around the cylindrical winding core 400.

The widths of the first and second electrodes may both be greater than widths of the first and second separator sheets, but may both comprise coated widths which are less than or equal to the width of the first and second separator sheets. Furthermore, the second electrode may comprise a coated width that may be slightly narrower than the coated width of the first electrode. In this way, the separator sheets may mechanically and electrically separate the coated surfaces of the first and second electrodes wound about the cylindrical winding core.

During the winding process, portions of the uncoated conductive edge sections of the electrode sheets may be cut or trimmed away leaving tabs protruding externally (in an axial direction) from the coated regions of the electrode sheets. In this way tabs may be integrally formed from the electrode sheets without welding separate discrete tabs to the electrode sheets, and without removing portions of the coating to expose the substrate foil. The tabs may be formed in a specific pattern or frequency relative to the winding angle of rotation, creating a series of co-located tab groups (e.g., tabs 106) mechanically free to be later deformed (e.g., consolidated and/or compressed) during a consolidating step and prior to a welding step. The consolidation and welding steps may serve to electrically connect the wound layers of the first electrode sheet to each other, to electrically connect the wound layers of the second electrode sheet to each other, and to electrically connect the wound layers of the first electrode sheet and the second electrode sheet to terminals of the electrochemical storage cell.

The electrode sheet cutting process may be performed based on the winding mandrel rotation angle. In this way, the tabs in each wound layer may be radially aligned and angularly co-located such that the tabs in succeeding layers of the first and second electrode sheets may form an externally protruding multi-layered group of tabs in the jellyroll structure that extends from the wound electrode sheet layer at the outer surface of the cell through to the wound electrode sheet layer at the outer surface of the cylindrical winding core.

The length of the tabs may be controlled to create a free arc length of the tab that covers an included angle in each layer of the electrode material in the jellyroll structure equal to or greater than 2 radians (114.6°) and less than 180° (e.g., less than $\pi$ radians). In another example, the length of the tabs may be controlled to create a free arc length of the tab that covers an included angle in each layer of the electrode material in the jellyroll structure equal to or greater than 2 radians (114.6°) and less than 178°. The length of the tabs may be controlled based on the total winding mandrel rotation angle or controlled based on one or more of winding angle, material thickness, and winding diameter (or radius) of the jellyroll structure.

Turning now to FIG. 6, it illustrates a perspective view of a partially assembled electrochemical storage cell 600 during winding of the first and second electrode sheets and first and second separator sheets onto a cylindrical winding core 630. FIG. The partially assembled electrochemical storage cell 600 includes a coated width 610 of an electrode sheet (e.g., a first electrode sheet or a second electrode sheet), an uncoated edge section 640 of the electrode sheet, and a separator sheet 620 (e.g., first or second separator sheet) wound to form a partial jellyroll structure 650. Although not explicitly shown in FIGS. 6A and 6B, the partially assembled electrochemical storage cell 600 may include both first and second electrode sheets and both first and second separator sheets partially wound to form partial jellyroll structure 650. The coated width 610 may be less than or equal to the width of the separator sheet 620 to ensure that the separator sheet 620 both electrically and mechanically separates the first electrode sheet from the second electrode sheet.

The uncoated edge sections 640 may comprise a plurality of tabs 670. The tabs 670 may be formed prior to winding or as the electrode sheet is wound onto the cylindrical winding core 630, by trimming or cutting away portions of the uncoated conductive edge sections therebetween. As shown in FIG. 6, a shape of the tabs 670 is generally long, and narrow. Furthermore, a length 690 of the tabs 670 increases (and a spacing 694 between tabs 670 increases) as a length of electrode sheet wound onto the cylindrical core increases so that upon winding the electrode sheet on the cylindrical winding core 630, the tabs 670 may be angularly co-located relative to the cylindrical winding core 630. As described above, the length of the tabs may correspond to an arc length covering an included angle equal to or greater than 2 radians upon winding the electrode sheet on the cylindrical winding core 630. Furthermore, the lengthwise centerlines 696 of successive tabs 670 may be spaced so that they are opposed 180° when wound on the cylindrical winding core 630, and form externally protruding multi-layered group of tabs in the jellyroll structure that extends from the wound electrode sheet layer at the outer surface of the cell through to the wound electrode sheet layer at the outer surface of the cylindrical winding core. In this way, a secondary trimming operation to correct the uniformity of the tab lengths resulting from conventional methods using stamping tab-forming processes is averted, thereby reducing manufacturing cost and complexity.

As shown in FIG. 6, the tabs 670, may axially protrude beyond the cylindrical winding core 630 when wound to form the jellyroll structure. An axial length of the cylindrical winding core 630 may be less than a width of the first and second electrode sheets so that the uncoated edge sections 640 and tabs 670 formed integrally therefrom of the electrode sheets protrude beyond the ends of the cylindrical winding core 630. In this way, portions of the electrode sheets adjacent to the slotted cutouts 670 may be deformed and compressed and consolidated towards or away from the cylindrical winding core 630 to electrically connect the first and second electrode sheets with the conductive inserts of the housing adjacent to a first end 654 of the jellyroll structure. Furthermore, uncoated edge sections of the first and second electrode sheets may protrude beyond the ends of the cylindrical winding core at first end 654 to electrically connect a first electrode sheet to a first conductive insert and a second electrode sheet to a second conductive insert. In this way, a first electrode sheet may further be electrically connected to a first terminal of the electrochemical storage cell, and a second electrode sheet may further be electrically connected to a second terminal of the electrochemical storage cell.

The tab forming cutting process can be performed by logic controlled laser cutting, high-pressure non-conductive abrasive media cutting, mechanical die cutting or by other commonly known industrial cutting or punching processes. The winding process may be continued until a final length of the first and second electrode sheets is wound, and/or a final winding diameter is wound. The jellyroll may then be rotated one or more additional revolutions to cover the outer layer of the jellyroll structure in its entirety with the first and/or second separator sheets, and the outer layer of the jellyroll may be fixed with one or more layers of adhesive tape. The tape may have the same width or be slightly wider than the first and/or second separator sheets. The resulting jellyroll structure and winding core is removed from the winding machine mandrel.

Turning now to FIG. 5A, it illustrates an end view of an electrochemical storage cell jellyroll structure comprising a cylindrical winding core 540 with wound electrode sheets and wound separator sheets generally shown at 520. A first electrode (e.g., anode or cathode) may comprise diametrically opposed multi-layered group of tabs 522 formed in a first electrode sheet, while a second electrode (e.g., cathode or anode) may comprise diametrically opposed multi-layered groups of tabs 526 formed in a second electrode sheet. The wound jellyroll structure may be enclosed at its outer surface by one more wound separator sheet layers 550. Although four groups of diametrically opposed groups of tabs is shown, the electrochemical storage cell jellyroll structure may comprise at least two groups of multi-layered tabs. An offset of 90° may aid manufacturing efficiency by increasing the manufacturing repeatability and accuracy of the tab positioning on the electrode sheets. For example, offsetting angularly co-located groups of tabs other than at 90° may increase manufacturing complexity, and/or increase the number of manufacturing defects. Furthermore, offsetting angularly co-located groups of tabs other than at 90° may increase a spacing between adjacent and opposing co-located groups of tabs, which may increase heat generation and which may reduce a risk of arcing or shorting between co-located groups of tabs of a first electrode sheet and a second electrode sheet.

Turning now to FIGS. 5B and 5C, they illustrate cross-sectional views of the electrochemical storage cell jellyroll structure of FIG. 5A taken at sections 5B-5B and 5C-5C. Multi-layered groups of tabs 522 may be formed in one of the first and second electrode sheets, while multi-layered groups of tabs 526 may be formed in another of the first and second electrode sheets.

Turning now to FIG. 7, it illustrates a partial cross-sectional view of an electrochemical storage multi-cell taken at section 7-7 of FIG. 8. The electrochemical storage multi-cell 700 comprises a housing 710 including four chambers 714. Each of the four chambers 714 includes an electrochemical storage cell 720. Furthermore, the electrochemical storage cells 720 may be thicker, comprising a higher number of wound layers towards an interior 702 of the multi-cell 700, whereas the electrochemical storage cells 720 may be thinner, comprising a lower number of wound layers towards an exterior 704 of the multi-cell 700. In this way, the volume of each electrochemical storage cell 720 may be approximately equivalent since the diameters of the winding cores and the electrochemical storage cells 720 decreases from an exterior 704 towards an interior 720 of the multi-cell. Each electrochemical storage cell 720 may comprise multi-layered groups of tabs 730, each of the groups of tabs 730 extending from multiple layers of one of the wound electrode sheet of each individual electrochemical storage cell 720. The tabs of each electrode may be consolidated, compressing the tabs to be in compressive contact with one of a plurality of metallic core surfaces (e.g., conductive inserts) 760 of the shared housing 710. The exposed and compressed tabs may be welded to the conductive inserts 760 to form a low resistance electrical and thermal connection between a first electrode of a first cell to a second electrode of a second cell adjacent to the first cell. The first and second electrode may comprise a positive and a negative electrode, respectively, or the first and second electrode may comprise a negative and a positive electrode, respectively. As an example, welding of the compressed tabs to the conductive inserts 760 may comprise ultrasonic vibration welding, or fusion welding such as laser welding or electron beam welding.

As shown in FIG. 7, the conductive inserts 760 (e.g., bus bars) may be inserted within, adjacent to, and/or at the tips 750 of walls of chambers 714. A size (e.g., thickness, length) of the conductive inserts 760 may be determined to sustain current loads of the electrochemical storage multi-cell, and the conductive inserts may be positioned in the electrochemical storage multi-cell to reduce a volume of material in forming the conductive inserts. In one example, conductive inserts 760 and 764 may form positive and negative terminals, respectively of the electrochemical storage cell 700. Furthermore, the tips 750 may be shaped or grooved to correspond with grooves or shaped features of the underside of a housing cover to enable sealing and fixing of the housing cover to the housing 710 and to enable mechanical and electrochemical isolation of the chambers 714. Electrochemical storage multi-cell 700 may further comprise a high current male interconnect terminal 790 for connecting the electrochemical storage multi-cell 700 to another electrochemical storage multi-cell in-series, or for connecting the electrochemical storage multi-cell 700 to external energy sinks. Interconnect latch 794 may be used to aid in securing an electrochemical storage multi-cell assembly. Securing interconnect latch 794 may comprise generating an audible click from a mechanical coupling which can aid in ensuring mating of the assembly to its intended position.

Turning now to FIG. 8, it illustrates a plan view of an electrochemical storage multi-cell 700. In the example of FIG. 8, electrochemical storage multi-cell 700 comprises an electrochemical storage quad-cell, including four concentric electrochemical storage cells 720 housed in chambers 714 of housing 710. Multi-cell 700 may comprise terminals 760 and 764 which may be positive and negative terminals, respectively, or negative and positive terminals, respectively. Multi-cell 700 may further comprise pairs of diametrically opposed multi-layered groups of tabs formed from uncoated conductive edges of electrode sheets of the individual electrochemical storage cells 720. Welding the multi-layered groups of tabs of adjacent electrochemical storage cells 720 may electrically connect an electrode of one electrochemical storage cell to an electrode of the opposite polarity of an adjacent electrochemical storage cell. In this way, low resistance electrical and thermal connections between adjacent cells may be formed. Accordingly, the housing chambers 714 may electrochemically and electrically isolate each electrochemical storage cell 720, except for where the multi-layered groups of tabs 730 are welded to the conductive inserts. In the example electrochemical storage quad-cell of FIGS. 7-8, welding may be performed at multiple locations, for example sixteen locations 830, 832, corresponding to each multi-layered group of tabs. Adjacent pairs 820 of multi-layered groups of tabs in adjacent concentric electrochemical storage cells may be welded to a common conductive insert of the housing 710 to form low resistance electrical and thermal connections between adjacent concentric electrochemical storage cells. Furthermore, some welds 832 (e.g., indicated by locations 5, 8, 15, 16 of FIG. 8) may serve to connect individual electrochemical storage cells 720 to the terminals (e.g., positive and negative terminals) 760, 764. Furthermore, some welds 832 (e.g., indicated by locations 15, 16 of FIG. 8) may serve to provide connection of the housing 710 to a housing cover 940.

After completion of the welding of the groups of tabs to the conductive inserts, a housing cover 940 may be attached to the open end of the shared housing 930, as shown in FIG. 9. The housing cover 940 may comprise a plastic housing cover to reduce material costs and to facilitate shaped features of the housing cover fabrication. Furthermore, housing cover 940 may be affixed to the housing 930 by epoxy, glue, welding (ultrasound, laser, or energy beam) or using mechanical attachment features (e.g., interlocking mechanical snaps), thereby ensuring that electrolyte fluid in each cell 932 is fluidly isolated and cannot commingle. Male interconnect terminals 936 and female interconnect terminal 944 may comprise high current interconnect terminals at top surface of cover 940 and bottom surface of the electrochemical storage multi-cell 900 may enable electrically connecting the electrochemical storage multi-cell 900 with high current capability for energy to flow through the assembly. In one example, interconnect terminals 936, 944 may comprise Radsok™ terminals. As shown in FIG. 9, a top surface of the cover 940 and a bottom surface of multi-cell 900 may be flat, allowing for stacking and electrical connection of multiple multi-cell assemblies in series via male and female interconnect terminals 936, 944, to a predetermined voltage or to a predetermined capacity at 12 V. Furthermore, the positioning of the male and female interconnect terminals 936, 944, and the stackability of the electrochemical storage multi-cell 900 may facilitate maintenance of a multi-cell stack in-situ, since an individual multi-cell assembly needing maintenance or replacement may be simply unplugged from a stack and replaced by plugging in a new multi-cell assembly.

Turning now to FIG. 10, it illustrates a partial cross sectional view of an electrochemical storage quad-cell 700 comprising a housing 710 and housing cover 940 affixed thereto. As indicated at 750, the grooved or shaped features of the tips of the walls of the cell chambers 714 correspondingly fit against grooved or shaped features of the underside of the housing cover 940. Furthermore, at the weld locations (e.g., indicated by locations 15, 16 of FIG. 8), bus bars 1050 integral to the housing cover 940 may be positioned to match via access windows 1046 to facilitate alignment of the housing cover 940 and welding of the bus bar 1060 to its corresponding bus bar 760 of housing 710. Access window 1046 may be of sufficient size to allow laser access for joining or welding two opposing bus bars together. Access window 1046 may be formed during fabrication of cover 940. In one example cover 940 may be fabricated via injection molding. After laser welding of the bus bar, access window 1046 may be sealed to ensure hermeticity of the electrochemical storage multi-cell. The bus bar 1060 may comprise copper or another conductive material.

Turning now to FIG. 11, it illustrates a plan view of an electrochemical storage multi-cell 1100 including a housing cover 940 affixed to the top of the multi-cell housing. Housing cover 940 may comprise fill ports 1110 radially and angularly distributed across the housing cover 940 and corresponding to each housing chamber. An electrolyte charge volume may be conveyed into each housing chamber of the multi-cell via the fill ports 1110. The entire volume of electrolyte charge volume may be held in the vertical electrolyte fill channels 1210 and horizontal electrolyte fill channels 1212 of the housing. In this way, the time to fill the multi-cell with electrolyte is reduced, the distribution of electrolyte in the multi-cell can be made uniform. Furthermore, soaking and absorption of the electrolyte into the housing chambers and electrode sheets therein may be facilitated by pressure and/or vacuum, vibration, and heating. A protrusion 1270 of housing 710 may comprise the male interconnect terminals. The electrolyte fill ports may be sealed by pressing-in-place and welding plastic fill plugs. After formation of the electrochemical storage multi-cell, the multi-cell may be subjected to a dip, spray, physical vapor deposition (PVD), or metal sputtering process to hermetically seal the entire multi-cell assembly. FIGS. 13A and 13B illustrate top and bottom perspective views of a hermetically sealed multi-cell 1300, including male interconnect terminals 790.

The electrochemical storage multi-cell described herein is formed without welding discrete tabs to each electrode sheet. Accordingly, manufacturing time is reduced and simplified, and capital investment for production winding and cell assembly equipment is lowered. Furthermore, forming tabs integrally from the electrode sheets allows for welding the tabs of the foil to the conductive inserts of the housing, and thereby provides mechanical support in addition to providing electrical connection to adjacent electrochemical storage cells. In this way discrete electrode tabs and tape for insulating the discrete electrode tabs in conventional methods are not used, reducing the manufacturing total part count, thereby simplifying manufacturing. The mechanical robustness of the multi-cell may also be increased because the jellyroll structures may be compressed and intimately supported between the housing chamber walls, the cylindrical winding core, and the housing cover.

As described herein, one example of an electrochemical storage multi-cell may be provided, comprising: a housing, including a plurality of concentric annular cell chambers; a plurality of electrochemical storage cells, wherein each of the plurality of annular cells are positioned in one of the plurality of annular cell chambers, and the plurality of annular cells are electrically connected in series; and a conductive electrolyte filling each of the annular cell chambers. The plurality of annular cell chambers comprises: first and second electrode sheets wound around a cylindrical core forming a jellyroll structure, the first and second electrode sheets each comprising uncoated conductive edges parallel to end faces of the jellyroll structure, and coated opposing surfaces between the uncoated conductive edges; and first and second separator sheets mechanically and electrically separating the coated opposing surfaces of the first and second electrode sheets and mechanically and electrically separating the cylindrical core and the coated opposing surfaces of the first electrode sheet, wherein the uncoated conductive edges include tabs formed by cutting out portions of the uncoated conductive edges between the tabs, the tabs protruding axially outward, and the tabs being angularly co-located relative to the cylindrical core upon forming the jellyroll structure. The housing includes exactly four concentric annular cell chambers. The electrochemical storage may be provided, further comprising: compressed angularly co-located tabs of the uncoated conductive edges, wherein the compressed angularly co-located tabs are electrically connected to each other. The electrochemical storage multi-cell may be provided, further comprising a cover, wherein each of the plurality of cell chambers are fluidly isolated with the cover affixed to the housing.

Turning now to FIG. 14, it illustrates an example method 1400 for an electrochemical storage cell. Method 1400 begins by forming the electrode sheets at 1410. Forming the electrode sheets may comprise coating both sides of a metallic sheet substrate at 1412 in specific widths, leaving uncoated sections between the coated sections of the specific widths. At 1414 method 1400 may dry and calendar the coated sheet substrates to cure and/or smooth and level the coated substrates. Next, method 1400 at 1416 may slit the coated sheets along alternating edges of the coated sections, thereby forming the electrodes. The composition of the coating may depend on the nature of the electrode. For example, an anode for a lithium-ion electrochemical storage cell may comprise an electro-active lithium intercalation material or metallic lithium coating coated onto both sides of a metallic foil substrate in a continuous coating process. As another example, a cathode for a lithium-ion electrochemical storage cell may comprise a mixture of lithiated iron-phosphate powder, conductive carbon and polymeric binder. Method 1400 may also be used for other types of electrochemical storage cells and is not limited to lithium-ion electrochemical storage cells.

Continuing at 1418, method 1400 determines if another electrode is to be formed. If another electrode is to be formed, method 1400 returns to 1412; otherwise method 1400 continues at 1420, where the electrode sheets are mounted. At 1422, method 1400 selects a winding core and mounts the winding core on a winding machine. As an example, a winding core may comprise a hollow cylindrical winding core, such as the cylindrical winding core 540 with a circular cross section.

Method 1400 continues at 1424 where a first and second separator sheet are affixed to the outer curved surface of the winding core and the winding core is rotated to wind at least one revolution of the first and second separator sheets on the winding core. The widthwise edges of the first and second separator sheet may be parallel to the central axis of the cylindrical core so that successive layers of the first and second separator sheets are wound in a uniformly parallel manner around the winding core. Furthermore, the first electrode sheet may be positioned so that the uncoated edge sections of wound layers may protrude beyond a first end of the winding core.

At 1426, the first electrode sheet is positioned between unwound ends of the first and second separator sheets adjacent to the winding core, and the winding core is rotated to wind at least one revolution of the first electrode sheet on the winding core. The widthwise edge of the first electrode sheet may be positioned parallel to the central axis of the cylindrical core so that successive layers of the first electrode sheet are wound in a uniformly parallel manner around the winding core. At 1428, the second electrode sheet is positioned on the surface of the second separator sheet, and the winding core is rotated to wind at least one revolution of the second electrode sheet on the winding core. In this way the first and second separator sheets electrically and mechanically separate coated widths of the first and second electrode sheets. The widthwise edge of the second electrode sheet may be positioned parallel to the central axis of the cylindrical core so that successive layers of the second electrode sheet are wound in a uniformly parallel manner around the winding core. Furthermore, the second electrode sheet may be positioned so that the uncoated edge sections of wound layers may protrude beyond a first end of the winding core. At 1430, the method may proceed to method 1500 wherein the winding, consolidation, and quad-cell assembly is described.

Turning now to FIG. 15, method 1400 continues at 1500, comprising winding and assembling electrical connections. At 1510, the winding process is performed. As an example, winding process 1510 may be carried out on a continuous winding machine, and may be executed by a computer controller. At 1512 the winding core is rotated to continuously wind electrode sheets and separator sheets to form the jellyroll structure of the electrochemical storage cell. At 1514, while the winding core is rotated, tabs may be cut or formed integrally otherwise from the uncoated edge sections of the electrode sheets. As described above, the length of the tabs and the spacing therebetween may be predetermined according to the cylindrical core radius, a thickness of the electrode sheets and the separator sheets, and a length of the electrode sheets and the separator sheets to be wound (or a final radius of the wound jellyroll structure). Furthermore, a length of the tabs may be based on a winding mandrel angle, and may correspond to an arc length covering an included angle equal to or greater than 2 radians (and less than 180 degrees) upon winding the electrode sheet on the cylindrical winding core 630. In another example, the length of the tabs may be controlled to create a free arc length of the tab that covers an included angle in each layer of the electrode material in the jellyroll structure equal to or greater than 2 radians (114.6°) and less than 178°. Furthermore, the lengthwise centerlines 696 of successive tabs 670 may be spaced so that they are opposed 180° (e.g., diametrically opposed) when wound on the cylindrical winding core 630, and form multi-layered groups of tabs 730 in the jellyroll structure that extend radially from the outer surface of the electrochemical storage cell through to the outer surface of the cylindrical winding core 630.

Further still, the angular winding speed may correspond to a speed of forming the tabs, the forming process being performed by logic controlled laser cutting, high-pressure non-conductive abrasive media cutting, mechanical die cutting, or other commonly known industrial cutting and/or punching processes. Method 1500 continues at 1516, where it determines if a final jellyroll structure diameter (e.g., electrochemical storage cell electrode diameter) has been reached. Alternately, at 1516, method 1500 may determine if a final length of the wound electrode sheets has been reached. If not, method 1500 returns to 1512 where the rotation of the winding core is continued.

If at 1516, the final jellyroll structure diameter has been reached, method 1500 continues at 1518 where one final rotation of the winding core is completed to enclose the outer surface of the electrochemical storage cell with one of the separator sheets. At 1520, the outer layer of the electrochemical storage cell comprising the separator sheet is fixed with adhesive tape, and the winding core along with the wound electrochemical storage cell electrode sheets is removed from the winding machine.

Method 1500 continues at 1530 where it determines if additional cells may be formed. For an electrochemical storage multi-cell comprising a number, N, cells, additional cells at 1530 may be formed until the Nth cell has been formed. For example, if fewer than 4 cells have been formed in an electrochemical storage quad-cell, method 1500 returns to 1422 after 1530. If no additional cells are to be formed, method 1500 continues at 1540, where the multi-cell is assembled.

At 1542, the individual electrochemical storage cells (jellyroll structures) are inserted or loaded into the corresponding housing chamber. The individual electrochemical storage cells may be sized to be concentric to form concentric cells when loaded into the housing. At 1544, the multi-layered groups of tabs of each electrochemical storage cell are consolidated and compressed towards an adjacent conductive insert of the housing, and welded thereto in order to electrically connect the layers of an electrode sheet in an individual cell to each other, and to an electrode of an adjacent cell of the opposite polarity. At 1546, a housing cover is affixed to the housing, wherein affixing includes gluing, mechanically coupling, and welding to ensure that the cell chambers are electrochemically and mechanically isolated. At 1548, the multi-cell assembly may be subjected to a dip, spray, physical vapor deposition (PVD), or metal sputtering process to hermetically seal the entire multi-cell assembly. After 1548, method 1500 and method 1400 end.

As described herein, a method for an electrochemical storage multi-cell may be provided, comprising: positioning each of a plurality of electrochemical storage cells in concentric annular chambers of a housing, the number of the concentric annular chambers corresponding to the plurality of electrochemical storage cells; electrically connecting each of the plurality of electrochemical storage cells in series; wherein each of the annular cell chambers are filled with conductive electrolyte. The method may be provided, further comprising: forming each of the plurality of electrochemical storage cells by winding first and second electrode sheets around a cylindrical core to form a jellyroll structure, the first and second electrode sheets each comprising uncoated conductive edges parallel to end faces of the jellyroll structure, and coated opposing surfaces between the uncoated conductive edges, winding first and second separator sheets around the cylindrical core between the first and second electrode sheets to mechanically and electrically separate the coated opposing surfaces of the first and second electrode sheets and to mechanically and electrically separate the cylindrical core and the coated opposing surfaces, and cutting out portions from the uncoated conductive edges of the first and second electrode sheets to form tabs, the tabs protruding axially outward, the tabs being angularly co-located relative to the cylindrical core upon forming the jellyroll structure. The method may be provided, wherein electrically connecting each of the plurality of electrochemical storage cells in series comprises compressing the angularly co-located tabs to electrically connect the uncoated conductive edges of a first electrode of one of the plurality of electrochemical storage cells to the uncoated conductive edges of a second electrode of an adjacent one of the plurality of electrochemical storage cells. The method may be provided, wherein electrically connecting each of the plurality of electrochemical storage cells in series further comprises welding the compressed tabs to a conductive insert of the housing to electrically connect the uncoated conductive edges of the first electrode of one of the plurality of electrochemical storage cells to the uncoated conductive edges of the second electrode of the adjacent one of the plurality of electrochemical storage cells. The method may be provided, further comprising hermetically sealing the electrochemical multi-cell by one or more of a dipping, spraying, physical vapor deposition, or metal sputtering process. The method may be provided, further comprising fluidly isolating each of the annular cell chambers. The method may be provided, wherein the plurality of electrochemical storage cells comprises four electrochemical storage cells, and the electrochemical storage multi-cell comprises an electrochemical storage quad-cell.

Although there are numerous advantages to continuous—e.g., roll-to-roll processing of electrode materials for use in electrochemical storage cells, this disclosure is also consonant with batch-type processing. Furthermore, although examples of lithium-ion electrochemical storage cells are described, the electrochemical storage cell, methods and systems therefor described herein also apply to other types of electrochemical storage cells.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. An electrochemical storage multi-cell, comprising:
   a housing, including a plurality of concentric annular cell chambers stacked in radial direction;
   a plurality of electrochemical storage cells, wherein
      each of the plurality of annular cells are positioned in one of the plurality of annular cell chambers, wherein each of the plurality of annular cell chambers comprises first and second electrode sheets wound around a cylindrical core forming a jellyroll structure, the first and second electrode sheets each comprising uncoated conductive edges parallel to end faces of the jellyroll structure, and coated opposing surfaces between the uncoated conductive edges;
      multiple groups of externally protruding uncoated tabs extend in an axial direction from the uncoated conductive edges of the first and second electrode sheets, wherein the tabs of the first and second electrode sheets are spaced apart along a length of the first and second electrode sheets; and
      the plurality of annular cells are electrically connected in series; and
   a conductive electrolyte filling each of the annular cell chambers.

2. The electrochemical storage multi-cell of claim 1, wherein each of the plurality of annular cell chambers comprises:
   first and second separator sheets mechanically and electrically separating the coated opposing surfaces of the first and second electrode sheets and mechanically and electrically separating the cylindrical core and the coated opposing surfaces of the first electrode sheet, wherein
   the tabs are angularly co-located relative to a central axis of the cylindrical core upon forming the jellyroll structure.

3. The electrochemical storage multi-cell of claim 2, wherein the cylindrical core comprises a plastic core.

4. The electrochemical storage multi-cell of claim 2, further comprising:
   compressed angularly co-located tabs of the uncoated conductive edges, wherein
   the compressed angularly co-located tabs are electrically connected to each other.

5. The electrochemical storage multi-cell of claim 1, wherein the housing includes exactly four concentric annular cell chambers.

6. The electrochemical storage multi-cell of claim 1, further comprising a cover, wherein each of the plurality of cell chambers is fluidly isolated with the cover affixed to the housing.

7. A method for an electrochemical storage multi-cell, comprising:
   positioning each of a plurality of electrochemical storage cells in concentric annular cell chambers of a housing stacked in radial direction, a number of the concentric annular cell chambers corresponding to the plurality of electrochemical storage cells;
   electrically connecting each of the plurality of electrochemical storage cells in series; wherein
      each of the annular cell chambers is filled with conductive electrolyte;
      forming each of the plurality of electrochemical storage cells includes winding first and second electrode sheets around a cylindrical core to form a jellyroll structure, the first and second electrode sheets each comprising uncoated conductive edges parallel to end faces of the jellyroll structure, and coated opposing surfaces between the uncoated conductive edges, winding first and second separator sheets around the cylindrical core between the first and second electrode sheets to mechanically and electrically separate the coated opposing surfaces of the first and second electrode sheets and to mechanically and electrically separate the cylindrical core and the coated opposing surfaces; and
      multiple groups of externally protruding uncoated tabs extend in an axial direction from the uncoated conductive edges of the first and second electrode sheets, wherein the tabs of the first and second electrode sheets are spaced apart along a length of the first and second electrode sheets.

8. The method of claim 7, wherein electrically connecting each of the plurality of electrochemical storage cells in series comprises compressing angularly co-located tabs to electrically connect the uncoated conductive edges of a first electrode of one of the plurality of electrochemical storage cells to the uncoated conductive edges of a second electrode of an adjacent one of the plurality of electrochemical storage cells.

9. The method of claim 8, wherein electrically connecting each of the plurality of electrochemical storage cells in series further comprises welding the compressed tabs to a conductive insert of the housing to electrically connect the uncoated conductive edges of the first electrode of one of the plurality of electrochemical storage cells to the uncoated conductive edges of the second electrode of the adjacent one of the plurality of electrochemical storage cells.

10. The method of claim 7, further comprising hermetically sealing the electrochemical storage multi-cell by one or more of a dipping, spraying, physical vapor deposition, or metal sputtering process.

11. The method of claim 7, further comprising fluidly isolating each of the annular cell chambers.

12. The method of claim 7, wherein the plurality of electrochemical storage cells comprises four electrochemical storage cells, and the electrochemical storage multi-cell comprises an electrochemical storage quad-cell.

* * * * *

UNITED STATES PATENT AND TRADEMARK OFFICE
CERTIFICATE OF CORRECTION

PATENT NO. : 10,079,371 B2  
APPLICATION NO. : 15/110729  
DATED : September 18, 2018  
INVENTOR(S) : James E. Dawson et al.

Page 1 of 1

It is certified that error appears in the above-identified patent and that said Letters Patent is hereby corrected as shown below:

In the Claims

In Claim 1, Line 12, correct "chambers stacked in radial direction" to read "chambers stacked in the radial direction".

In Claim 7, Line 5, correct "stacked in radial direction" to read "stacked in the radial direction".

Signed and Sealed this  
Thirteenth Day of November, 2018

Andrei Iancu  
*Director of the United States Patent and Trademark Office*